United States Patent [19]

Zvetkov et al.

[11] 4,167,124
[45] Sep. 11, 1979

[54] VARIABLE-SPEED CHAIN DRIVE UNIT

[75] Inventors: Atanas Z. Zvetkov; Stanislav Z. Zvetkov, both of Sofia, Bulgaria

[73] Assignee: DSO "RODOPA", Sofia, Bulgaria

[21] Appl. No.: 783,825

[22] Filed: Apr. 1, 1977

[51] Int. Cl.$^2$ .................. F16H 55/30; F16H 55/54
[52] U.S. Cl. ............................ 74/230.19; 74/244; 74/230.18; 74/230.21
[58] Field of Search ............ 74/244, 230.19, 567, 74/230.18, 230.2, 230.21, 230.22, 230.23

[56] References Cited

U.S. PATENT DOCUMENTS

| | | | |
|---|---|---|---|
| 724,449 | 4/1903 | Dumaresq | 74/244 |
| 1,144,381 | 6/1915 | Reimers | 74/230.19 |
| 1,446,294 | 2/1923 | Healey | 74/230.21 |
| 2,344,341 | 3/1944 | Coen | 74/230.21 |
| 3,142,187 | 7/1964 | Kane et al. | 74/567 |
| 3,238,797 | 3/1966 | Coughren | 74/567 |
| 3,850,044 | 11/1974 | Hagen | 74/230.23 |
| 4,030,373 | 6/1977 | Leonard | 74/230.19 |
| 4,068,539 | 1/1978 | Nye | 74/230.19 |

FOREIGN PATENT DOCUMENTS

| | | | |
|---|---|---|---|
| 315070 | 3/1970 | Bulgaria | 74/567 |
| 854734 | 9/1952 | Fed. Rep. of Germany | 74/244 |
| 882511 | 5/1953 | Fed. Rep. of Germany | 74/230.19 |

Primary Examiner—Samuel Scott
Assistant Examiner—William R. Henderson
Attorney, Agent, or Firm—Karl F. Ross

[57] ABSTRACT

A drive unit for varying the transmission ratio between two parallel rotatable shafts is provided with a disk mounted on each shaft for rotation therewith, the disks being formed with a plurality of radial grooves in which respective bearings are provided. Each bearing is provided with a wheel, at least one of which on each disk is engaged by an endless chain, the bearing being radially displaceable in the grooves by a nut provided in each bearing which is limitedly radially displaceable relative thereto and is in engagement with a rotatable radial screw provided in each groove for displacing the nut. Between the nut and the bearing there are provided respectively a compression spring and cam means for enabling the nut to be displaced by the rotating screw when the respective wheel of the respective bearing is engaged by the chain without the bearing being displaced, the bearing being displaced upon disengagement from the chain.

6 Claims, 2 Drawing Figures

VARIABLE-SPEED CHAIN DRIVE UNIT

FIELD OF THE INVENTION

This invention relates to a variable-speed drive unit for varying the transmission ratio between two parallel shafts in rotation during idle run, as well as under load, the transmission of motion between them being by means of a chain.

BACKGROUND OF THE INVENTION

Variable-speed drive units for varying the transmission ratio between two parallel shafts in rotation during idle run, as well as under load are known, and in which the transmission of motion between them is effected by friction, i.e. by the force of friction. The force of friction is the function of the amount of pressure between the elements transmitting the motion, and since, from a design aspect, it is disadvantageous to produce large amounts of pressure because of wear, the use of such variable-speed drive units is limited with respect to the transmitted power because of slippage. Moreover, since slippage is inevitable in the case of friction drive, these variable-speed drive units cannot provide a precise variation of the speeds.

OBJECT OF THE INVENTION

It is, therefore, the general object of the present invention to avoid the aforementioned drawbacks by providing a drive unit without limitations with respect to the transmitted power, the transmission of the motion being effected by means of chains.

SUMMARY OF THE INVENTION

This object is achieved by means of a unit comprising two disks, each mounted on one of two parallel shafts, the disks being provided with a number of chain wheels (sprocket wheels) which are arranged circularly around the axis of the corresponding disk and are threaded onto radial screws so that they can be displaced radially along them. The radial displacement over both disks is synchronized, so that when the chain wheels on one of the disks approach its center, the chain wheels on the other disk move away from its center. The motion is transmitted from the one shaft to the other by means of a chain, which engages the chain wheels of both disks. One of the chain wheels on each disk does not rotate during its radial displacement and serves as a driving wheel, while the adjacent wheels on both sides are rotated forceably during this displacement by means of a gear rim in their axes and a toothed rack, fastened rigidly to the disk so that during the radial displacement there is provided a regular engagement of the chain with the teeth of the chain wheels.

So that the outward radial displacement of the chain wheels should not take place against the force of the chain when engaged thereby, two sleeves are provided in the bearings supporting the chain wheels and effecting their variable radial displacement. These sleeves touch each other at their end faces which are formed as cam surfaces, one of the sleeves being connected rigidly to the bearing, while the other rotates with the screw, which effects the radial displacement of the bearing. The sleeves rotate with respect to one another and by means of their cam surfaces, approach or move away from each other at a predetermined rate, and then return to their initial mutual positions. This relative movement of the sleeves during their radial displacement maintains the same length of the sides of the polygon embraced by the chains during this stroke, after which they abruptly change length by one thread pitch of the radial screws, or fraction thereof.

The inclination of the cam surfaces between both sleeves is such, that when the chain wheels move outwardly, the sleeves approach one another, and when the chain wheels move inwardly, the sleeves move away from each other, thus avoiding a radial displacement against the radial pressure of the chain and a relieving of the complete mechanism for radial displacement is achieved.

The abrupt separation of the sleeves during the outward movement of the chain wheels is effected during the pass of the bearing through the free arc between both branches of the chain, where the sleeves move away from one another under the action of a spring disposed between them, as well as under the action of the centrifugal force. The spring between them contributes also to the impact-free engagement of the chain with the teeth of the wheels when engaged thereby.

BRIEF DESCRIPTION OF THE DRAWING

The above and other objects, features and advantages of the invention will become more readily apparent from the following description, reference being made to the accompanying drawing, in which.

SPECIFIC DESCRIPTION

Figure 1:
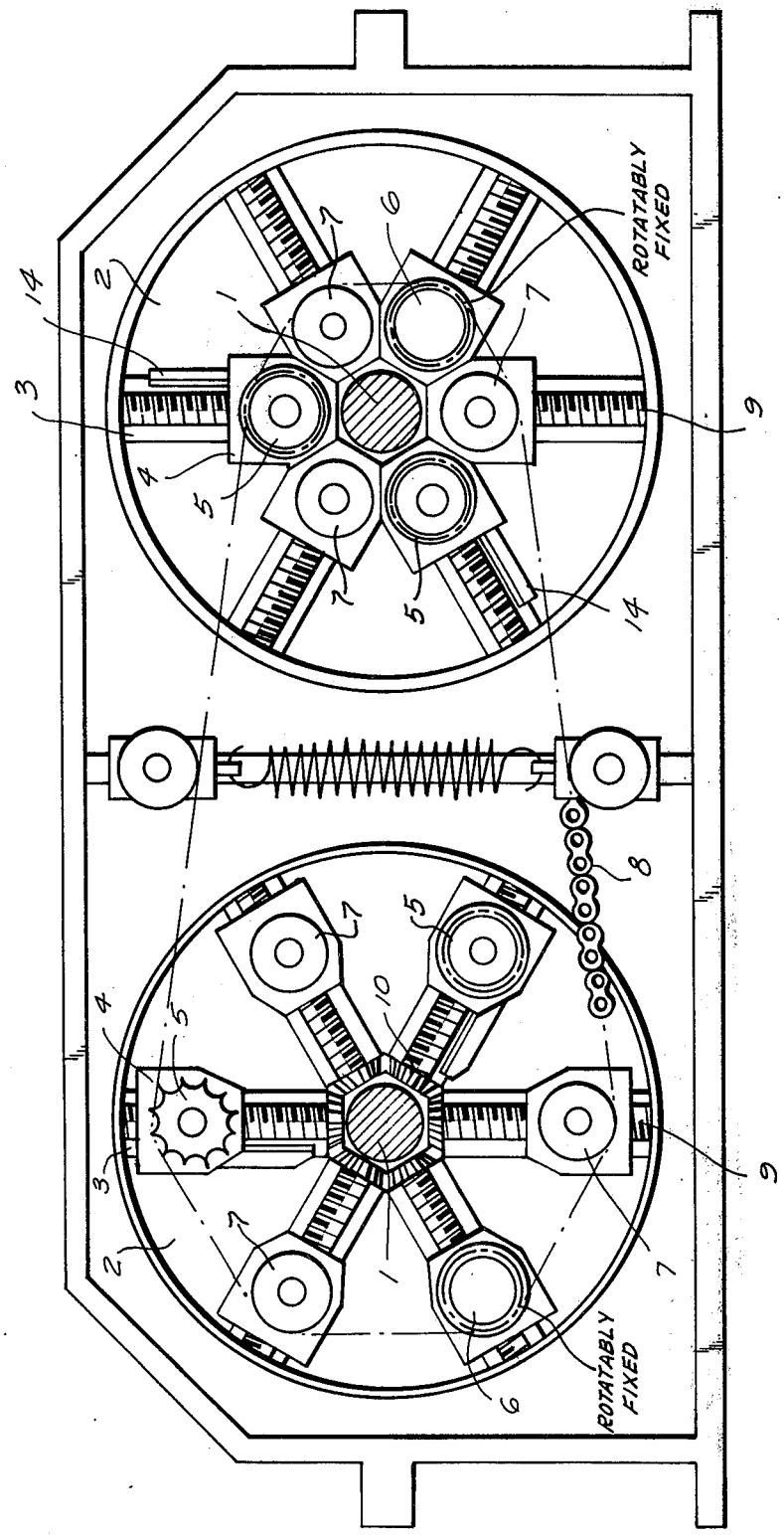
FIG. 1 is a longitudinal vertical cross-sectional view through the variable-speed drive unit.
Figure 2:
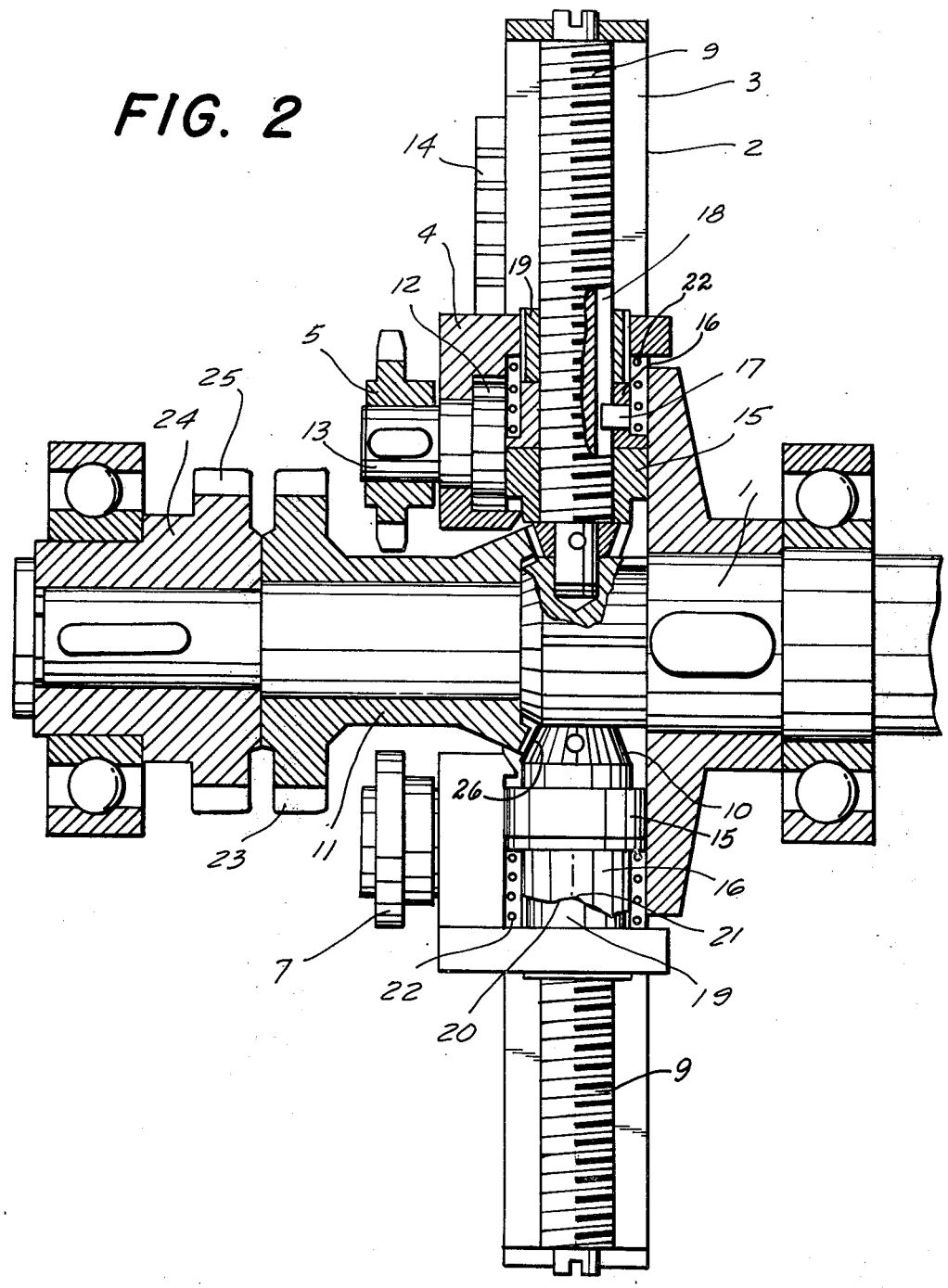
FIG. 2 is a transverse vertical cross-sectional view through one of the disks of the variable-speed drive unit.

Onto each of two parallel shafts 1 there is fastened rigidly therewith a disk 2 having radial grooves 3, inside of which are disposed radially movable bearings 4, supporting chain wheels 5 and 6 and rollers 7, the chain wheels 5 and 6 and the rollers 7 of both disks 2 being embraced by a chain 8. In the grooves 3 of disks 2 there are provided radial screws 9, which pass through bearings 4, the radial screws 9 being journaled so as to permit rotation relative to disks 2 and are provided with bevel toothed gears 10 at their inner ends, which are in engagement with the bevel toothed rim 26 of a pair of sleeves 11, each of which embraces a shaft 1. One of the chain wheels 6 on each disk 2 is fastened rigidly to the bearing 4 which supports it, while the other chain wheels 5 are provided with teeth 12 on their axles 13, which are in engagement with toothed racks 14, fastened rigidly to disks 2 alongside the displacement path of the chain wheels 5.

Inside each bearing 4 there is a nut 15, which is threaded over the radial screw 9, and has a rectangular outer shape, so that it cannot turn with respect to bearing 4. Abutting the nut 15 there is provided a rotating sleeve 16, connected by means of a pin 17 with a longitudinal groove 18 of radial screw 9, so that it can rotate together with screw 9. Abutting the other end of rotating sleeve 16 there is provided a non-rotating sleeve 19, fixed rigidly to bearing 4.

Cam surfaces 20, by which both sleeves 16 and 19 abut one another, are formed with peaks 21, the number and height of peaks 21 being in such a ratio to the pitch of the thread of radial screw 9 and the number of radial grooves 3 of disks 2 that each peak 21 corresponds to an increase or decrease of the sum of the length of the sides of the polygon embraced by chain 8 equal to one turn of the screw 9. Between the rotating sleeve 16 and bearing 4 there is provided a spring 22, which is loaded by compression. The rotatable sleeve 11 embracing shaft 1 is also formed with gear teeth 23, and next to it, connected rigidly to shaft 1, there is provided a sleeve 24, which is also provided with gear teeth 25.

In operation of the variable-speed drive unit, during the rotation of shafts 1, the relative rotation of toothed rims 23 and 25 with respect to each other is effected in a known way, for example with planetary toothed wheels, so that the sleeve 11 is rotated with respect to shaft 1. By means of its bevel toothed rim 26, sleeve 11 rotates the bevel toothed wheels 10 of radial screws 9, which displaces the nuts 15 threaded on them. During outward displacement of the nuts 15, the rotating sleeves 16 arranged on the screws 9 compress the springs 22 against bearings 4 to bias them outwardly, and during inward movement, the springs 22 are relieved and the bearings 4 follow the inward motion of the nuts 15. Together with the bearings 4 there is effected a radial displacement of the chain wheels 5 and 6 and the rollers 7. Both sleeves 11, over both shafts 1, rotate simultaneously but in different directions, which is effected in a known way, for example with a planetary gear included in the system of rotation of the toothed rims 23 and 25, so that while the bearings 4 on one of the disks 2 approach its center, the bearings on the other disk move away from it. Thus there is achieved a variation of the diameters assumed by the chain over both disks 2, and simultaneously a variation of the transmission ratio between them.

As the radial screw 9 rotates, sleeve 16 is also rotated relative to the non-rotating sleeve 19, which is fixed to bearing 4, and their cam surfaces 20, rotating one with respect to the other, advance the sleeves toward or move them away from one another until their peaks 21 meet. In the meantime, in the zone or portion of the disks embraced by the chain where its pressure is much higher than the pressure of spring 22, the radial displacement of nut 15 is compensated by the mutual displacement of both sleeves 16 and 19 toward each other, and bearings 4 are in fact not displaced, and thus the length of the polygon embraced by the chain is not varied.

When the peaks 21 meet during the radial approach of the bearing 4, they pass one another without hindrance and the fixed sleeve 19 sinks against the rotating sleeve 16, thus effecting the abrupt approach of bearing 4 towards the center. When the peaks meet during the radial movement away, the spring 22 moves sleeves 16 and 19 away from each other. This takes place abruptly as the wheel enters the zone in which it is not embraced by the chain. Only after entering again the zone in which its wheel is embraced by chain 8 do the sleeves 16 and 19 touch again, the peaks 21 having passed one another. During its radial approach or movement away, respectively, the chain wheels rotate around their axis by means of the teeth 12 and the toothed rack 14, thus providing an even engagement of chain 8 between wheels 5 and rollers 7 and the non-rotating chain wheel 6, while the abrupt displacement of all bearings 4, increasing or reducing, respectively, the length of the sum of the sides of the embraced polygon by one pitch of screw 9, provides the even engagement of the chain for the whole polygon.

What we claim is:

1. A drive unit for varying the transmission ratio between two rotatable parallel shafts, comprising:
    a respective disk fixedly mounted on each of said shafts for rotation therewith;
    a plurality of radial grooves formed in each of said disks;
    a respective bearing provided in each of said grooves;
    a wheel journaled in each of said bearings;
    an endless chain engaging at least one of said wheels on each of said disks;
    a respective nut provided in each of said bearings and limitedly radially displaceable relative thereto;
    a respective radial screw provided in each of said grooves and engaging said nut in said bearing in said respective groove;
    means on said drive unit for rotating said screws in opposite directions on said respective disks;
    a respective compression spring between each of said nuts and said bearings;
    respective cam means between each of said nuts and said bearings enabling said nuts to be displaced by said screws during engagement of the respective wheel of said bearing by said chain, whereby said bearing is displaced outwardly by said spring relative to said nut upon release of said respective wheel by said chain; and
    respective means engageable by said nuts on each of said bearings for the inward displacement of said bearings.

2. The drive nut defined in claim 1 wherein at least one of said respective wheels on each of said disks is rotated by rack and pinion means provided thereon.

3. The drive unit defined in claim 2 wherein at least one of said respective wheels on each of said disks is fixedly mounted on the respective bearing thereof.

4. The drive unit defined in claim 3 wherein at least one of said respective wheels on each of said disks is an idler roller.

5. The drive unit defined in claim 1 wherein said means for rotating said screws includes:
    a respective bevel gear provided at the inner end of each of said screws; and
    a respective sleeve provided on each of said shafts, said sleeve being formed with a beveled toothed rim engaging said bevel gears and said sleeve being rotatable relative to said shaft.

6. The drive unit defined in claim 1 wherein said cam means comprises:
    a first sleeve slidably mounted on said screw radially outward of said nut and abutted thereby, said first sleeve being rotatable with said screw and having its outward end face formed with undulations defining a first cam surface; and
    a second sleeve slidably mounted on said radially outward of said first sleeve and fixed to said bearing, said second sleeve being formed with undulations on the inner end face thereof defining a second cam surface complementary with said first cam surface.

* * * * *